US008129681B2

(12) United States Patent
Chun

(10) Patent No.: US 8,129,681 B2
(45) Date of Patent: Mar. 6, 2012

(54) BETA ENERGY EXTRACTOR

(75) Inventor: Sebong Chun, Orange, CA (US)

(73) Assignee: The Boeing Company, Chicago, IL (US)

( * ) Notice: Subject to any disclaimer, the term of this patent is extended or adjusted under 35 U.S.C. 154(b) by 1314 days.

(21) Appl. No.: 11/954,190

(22) Filed: Dec. 11, 2007

(65) Prior Publication Data

US 2011/0278984 A1 Nov. 17, 2011

(51) Int. Cl.
*G01T 1/00* (2006.01)

(52) U.S. Cl. ..................................... 250/336.1; 310/305

(58) Field of Classification Search ............... 250/336.1, 250/381; 310/301–305; 373/100
See application file for complete search history.

(56) References Cited

U.S. PATENT DOCUMENTS

| | | | | |
|---|---|---|---|---|
| 3,290,522 | A * | 12/1966 | Ginell | 310/305 |
| 4,835,433 | A * | 5/1989 | Brown | 310/305 |
| 5,111,099 | A * | 5/1992 | Smith | 310/305 |
| 2006/0028144 | A1* | 2/2006 | Chun | 315/39.3 |
| 2006/0139168 | A1* | 6/2006 | Pratt et al. | 340/539.22 |

OTHER PUBLICATIONS

Granatstein et al., High-Power Microwave Sources, 1987, pp. 309-327, Artech House, Inc., Norwood, MA, USA.
Heikkinen et al., Planar Rectennas for 2.45GHz Wireless Power Transfer, 2000 IEEE, 0-7803-6267-5, pp. 63-66.
Granatstein et al., High-Power Microwave Sources, 1987, pp. 309-327, Artech House, Inc., Norwood, MA, USA.
Heikkinen et al., Planar Rectennas for 2.45GHz Wireless Power Transfer, 2000 IEEE, 0-7803-6267-5, pp. 63-66.
Akkermans et al., Analytical Models for Low-Power Rectenna Design, IEEE Antennas & Wireless Prop. Letters, Jun. 2005, 1536-1225, vol. 4, pp. 187-190.

* cited by examiner

*Primary Examiner* — David Porta
*Assistant Examiner* — Marcus Taningco
(74) *Attorney, Agent, or Firm* — Canady & Lortz LLP; Bradley K. Lortz

(57) ABSTRACT

The present disclosure is directed to an energy extraction device that employs a radioactive isotope, such as $^{90}$Sr, as a charged particle source. The decaying radioactive isotope emits energetic charged particles, such as beta particles, into a magnetic field. Because the magnetic field is substantially normal to the paths of the charged particles, a force is induced on the charged particles normal to both the path and the magnetic field. The induced force causes the charged particles to assume circular paths, forming a circulating charged particle beam that is contained within a structure. The circulating charged particle beam emits cyclotron radiation. The structure includes one or more rectennas around the interior wall which convert the cyclotron radiation to electrical energy as a direct current voltage.

20 Claims, 7 Drawing Sheets

BETA ENERGY EXTRACTOR

BACKGROUND

1. Field

The present disclosure relates crossed-field devices using radioactive isotopes. Particularly, this disclosure relates to power generation in crossed-field devices employing radioactive isotopes.

2. Description of the Related Art

Power systems providing electrical power for spacecraft have traditionally utilized solar energy or radioactive materials as a power source. Solar power systems, employing solar cells to capture power from the sun and convert it to electrical energy, are often used in satellite applications where the spacecraft remains within reasonable proximity and view of the sun. Among power systems using radioactive isotopes (radioisotopes) as fuel in space applications, there are two significant types, reactor-based systems and radioisotope thermal generators (RTGs). Although a typical RTG delivers less power than a typical reactor-based system, reactor-based power systems are much more complex and less reliable than RTGs.

A radioisotope thermal generator (RTG) is a solid state electrical device which develops electrical power from a decaying radioisotope. A typical RTG comprises a central core of a decaying radioisotope, such as $^{238}$Pu. The radioisotope generates heat as it decays. The RTG converts the heat energy of a decaying radioisotope into electricity through an array of thermocouples. A thermocouple converts thermal energy directly into electrical energy. For example, a thermocouple may be made of two metal materials that can both conduct electricity. They are connected to each other in a closed electrical circuit. If the two metals are at different temperatures, an electric current will flow in the circuit delivering electrical power. Excess heat energy is rejected from the RTG. Due to the use of the radioisotope, the entire RTG must be properly shielded.

Unfortunately, conversion of the heat energy to electricity makes RTGs very inefficient. RTGs operate with an energy conversion efficiency of less than ten percent, typically less than five percent. Most of the energy from the decaying radioisotope is lost as excess thermal energy and must be rejected from the spacecraft. Thus, RTGs waste much of the available energy from the decaying radioisotope. In addition, RTGs are relatively expensive to manufacture (although not as expensive as reactor-based power systems).

In view of the foregoing, there is a need in the art for power systems in space applications that are simple, reliable, safe and less expensive. Further, for power systems which employ radioactive isotopes, there is a need for such power systems to obtain higher energy conversion efficiencies. As detailed hereafter, these and other needs are satisfied by the present disclosure.

SUMMARY

The present disclosure is directed to an energy extraction device that employs a radioactive isotope, such as $^{90}$Sr, as a charged particle source. The decaying radioactive isotope emits energetic charged particles, such as beta particles, into a magnetic field. Because the magnetic field is substantially normal to the paths of the charged particles, a force is induced on the charged particles normal to both the path and the magnetic field. The induced force causes the charged particles to assume circular paths, forming a circulating charged particle beam that is contained within a structure. The circulating charged particle beam emits cyclotron radiation. The structure includes one or more rectennas around the interior wall which convert the cyclotron radiation to electrical energy as a DC voltage.

In general, an apparatus embodiment comprises a radioactive means for emitting charged particles, means for receiving the circulating charged particle beam, means for inducing a magnetic field substantially normal to movement of the emitted charged particles and producing a circulating charged particle beam yielding electromagnetic radiation, and rectenna means for converting the electromagnetic radiation to a voltage.

In one example, a typical apparatus embodiment of the disclosure comprises a radioactive isotope emitting charged particles, a chamber receiving the emitted charged particles, one or more magnets disposed to provide a magnetic field across the chamber and substantially normal to movement of the emitted charged particles to produce a circulating charged particle beam within the chamber, the circulating charged particle beam yielding electromagnetic radiation, and one or more rectennas disposed proximate to the circulating charge particle beam, each converting the electromagnetic radiation to a voltage at an output. The radioactive isotope may be disposed centrally within the chamber. The one or more magnets may comprise a plurality of permanent magnets disposed at opposing sides of the chamber.

The chamber may be cylindrical with the magnetic field provided along a length of the cylindrical chamber. In this case, the one or more magnets may comprise a plurality of permanent magnets disposed at opposing ends of the cylindrical chamber. In addition, the one or more rectennas may comprise a plurality of rectennas disposed around an interior wall of the cylindrical chamber.

In some embodiments of the disclosure, the charged particles may comprise beta particles and the radioactive isotope is selected from the group consisting of 90Sr, 106Ru, 144Pm, 170Tm, 137Cs, and 144Ce. Alternately, the charged particles may comprise alpha particles and the radioactive isotope is selected from the group consisting of 238Pu, 210Po, 242Cm, and 244Cm.

In a similar manner, a typical method embodiment comprises the steps of emitting charged particles from a radioactive isotope, receiving the emitted charged particles within a chamber, providing a magnetic field across the chamber and substantially normal to movement of the emitted charged particles with one or more magnets to produce a circulating charged particle beam within the chamber, generating electromagnetic radiation from the circulating charged particle beam, and converting the electromagnetic radiation to a voltage at an output with each of one or more rectennas disposed proximate to the circulating charge particle beam. Method embodiments of the disclosure may be further modified consistent with apparatuses and systems described herein.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and in which is shown by way of illustration a specific embodiment in which the disclosure may be practiced. It is to be understood that other embodiments may be utilized and structural changes may be made without departing from the scope of the present disclosure.

1. Circulating Charge Particle Beam from a Radioactive Isotope

Crossed-field devices are a class of electronic devices which employ a magnetic field (B-field) and an electric field (E-field) at right angles to one another operating upon a flow of electrons. One application for such devices has been to elicit high frequency electromagnetic radiation from a transfer of energy from electrons moving in a plane normal to an applied magnetic field. Typically an electric field is used to drive the motion of the electrons. Thus, the driving electric field is normal (i.e., crossed) to the magnetic field. For a discussion of various crossed-field devices, see "High Power Microwave Sources" Victor Granatstein and Igor Alexeff, Editors, Artech House, Inc., 1987, pp. 309-327, which is incorporated by reference herein. However, embodiments of the present disclosure harness electrons (or other charged particles) emitted from a radioactive isotope at a relatively high velocity as described hereafter rather than accelerate electrons under an electric field. The physics behind developing a circulating electron beam from a radioactive isotope are described here.

When an electron is accelerated by a potential V, its relativistic kinetic energy is given by the following equation.

$$m_0(\gamma-1)c^2=eV \tag{1}$$

This may be approximated as follows in non-relativistic limit where $m_0$ is the rest mass of the electron.

$$m_0(\gamma-1)c^2 \approx m_0\left(1+\frac{1}{2}\frac{v^2}{c^2}-1\right)c^2 = \frac{1}{2}m_0v^2 = \text{eV} \tag{2}$$

Solving equation (3) in terms of v, yields the following.

$$m_0(\gamma-1)c^2 = m_0\left(\frac{1}{\sqrt{1-\frac{v^2}{c^2}}}-1\right)c^2 = \text{eV} \tag{3}$$

Equation (3) can be further reduced to the following result.

$$v = \left(\frac{\sqrt{1+\frac{2m_0c^2}{\text{eV}}}}{1+\frac{m_0c^2}{\text{eV}}}\right)c \tag{4}$$

From equation (4), an electron accelerated by 3MV, a typical Beta emitter decay energy, potential has a speed determined below.

$$v = \left(\frac{\sqrt{1+\frac{2\times9.1\times10^{-31}\times(3\times10^8)^2}{1.6\times10^{-19}\times3\times10^6}}}{1+\frac{9.1\times10^{-31}\times(3\times10^8)^2}{1.6\times10^{-19}\times3\times10^6}}\right)c = \left(\frac{\sqrt{1+0.3415}}{1+0.1706}\right)c = 0.99c \tag{5}$$

Figure 1A:
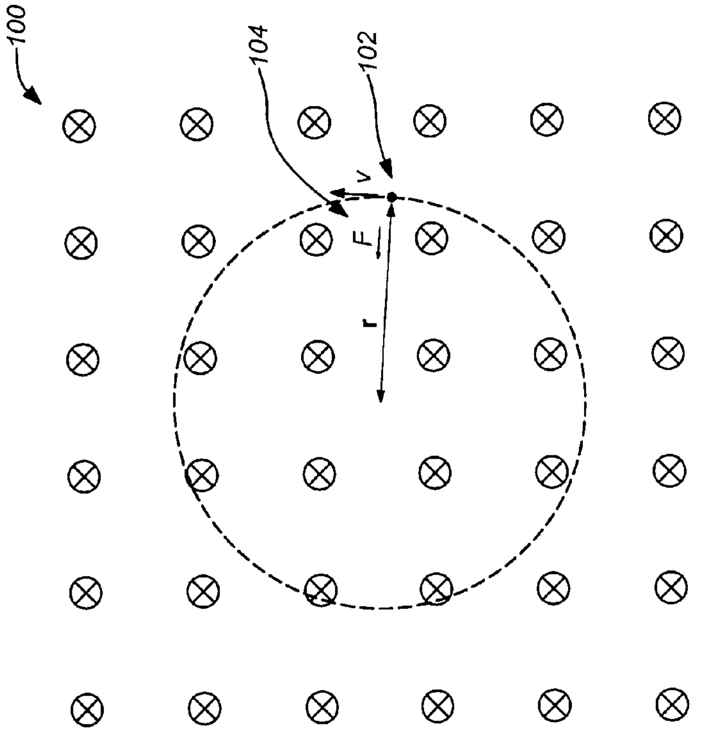
FIG. 1A a top view of a moving electron directed into a circular path under a magnetic field.

FIG. 1A is a top view of a moving electron directed into a circular path under a magnetic field 100. The electron 102 with velocity v is passing through a uniform magnetic field 100 perpendicular to the page and is accordingly subject to the Lorentz force 104 given by the following equation.

$$F=evB \tag{6}$$

The centripetal force on the electron is given as follows.

$$F = \frac{mv^2}{r} = \frac{m_0\gamma v^2}{r} \tag{7}$$

We can solve equations (6) and (7) together, and apply equation (3) to yield an expression of $\gamma$.

$$B = \frac{m_0}{er}\left(\frac{\text{eV}}{m_0c^2}+1\right)\left(\frac{\sqrt{1+\frac{2m_0c^2}{\text{eV}}}}{1+\frac{m_0c^2}{\text{eV}}}\right)c = \frac{m_0}{er}\frac{\text{eV}}{m_0c^2}\sqrt{1+\frac{2m_0c^2}{\text{eV}}}\,c = \frac{1}{r}\frac{V}{c}\sqrt{1+\frac{2m_0c^2}{\text{eV}}} \tag{8}$$

This becomes the following in a non-relativistic limit.

$$B^2 = \frac{1}{r^2}\frac{V^2}{c^2}\left(1+\frac{2m_0c^2}{\text{eV}}\right) \approx \frac{1}{r^2}\frac{V^2}{c^2}\left(\frac{2m_0c^2}{\text{eV}}\right) = \frac{2m_0V}{er^2} \text{ or } V = \frac{eB^2r^2}{2m_0} \tag{9}$$

Equation (9) represents the Hull cut-off condition, which provides the relationship between magnetic field B and anode voltage V (assuming a zero cathode voltage) when an electron is bent enough so that no electron will hit the anode so that there is no anode current, e.g. as in a typical non-relativistic magnetron. Therefore, the magnetic field required to confine an electron with 3 MeV kinetic energy on the circular orbit with radius 10 cm is given by the following relation (where units are all MKS).

$$B = \frac{1}{r}\frac{\text{V}}{c}\sqrt{1+\frac{2m_0c^2}{\text{eV}}} = \frac{3\times10^6}{0.1\times3\times10^8}\sqrt{1+0.3415} = 0.116\ \text{T} = 1.16\ \text{KGauss} \tag{10}$$

It can be shown that developing a magnetic field of this strength is possible and practical.

For example, Dexter Magnetic Technology's website (http://www.dextermag.com) provides a magnetic field strength calculator for various permanent magnet topologies. Among them, a permanent magnet dipole calculator is provided which presents topology similar to what may be employed in a typical embodiment of the disclosure. A steel yoke in a "C" configuration supports two rectangular permanent magnets held at the ends to form a gap for the magnetic field. The width (W) and length (L) are the facing areas of the magnets and the height (H) is the gap measurement between them. An example permanent magnet structure may have the overall dimension of 5"(W)×5"(L)×5"(H) with a 0.5" thick magnet on each side. A residual Induction ($B_r$) of 13 KGauss is a reasonable number for the selected example material of Nd—Fe—B. This yields an estimated magnetic field strength of approximately 1.4 K Gauss at the center where the magnetic field is the weakest. In another example, the overall dimensions of the structure are 5"(W)×5"(L)×3"(H) for another pair of 0.5" thick Nd—Fe—B permanent magnets. In this case, the magnetic field is approximately 2.4 K Gauss at the center where the magnetic field is the weakest. The stronger B field is a result of having shorter gap dimension (closer to the dipole).

Figure 1B:
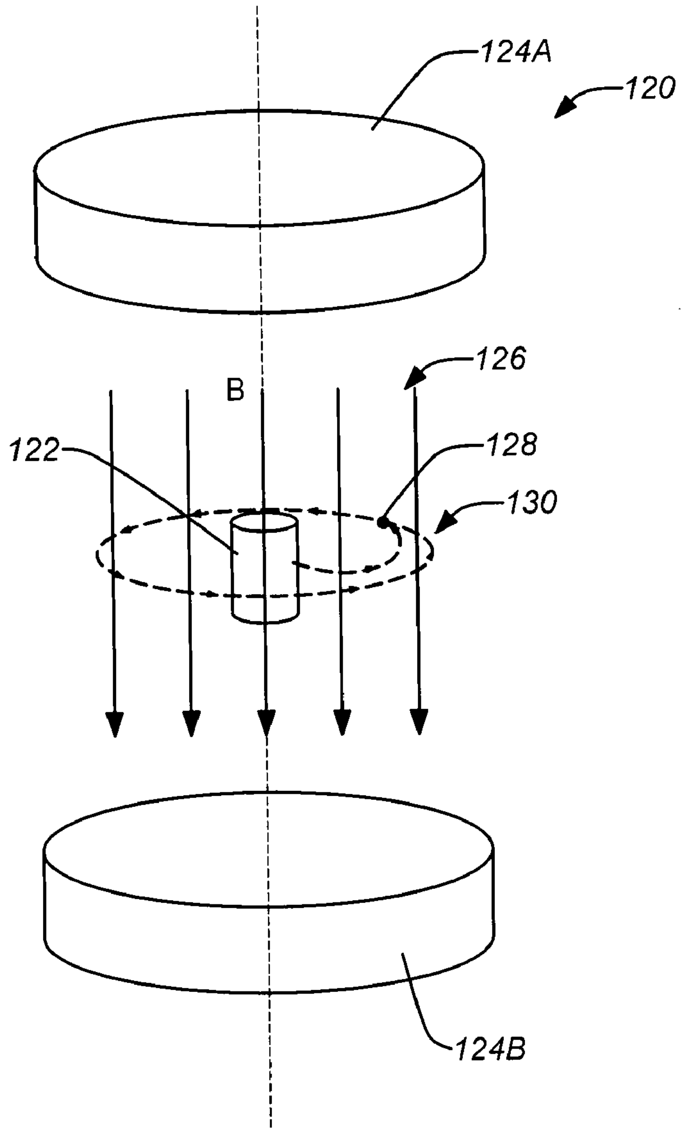
FIG. 1B illustrates developing a circulating charged particle beam from a radioactive isotope.

FIG. 1B illustrates developing a circulating charge particle beam from a radioactive isotope. The device 120 includes a centrally disposed radioactive isotope 122 within a chamber that emits charged particles 128 such as beta particles (i.e., electrons). For example, the radioactive isotope emitting beta particles may be selected from the group consisting of $^{90}$Sr, $^{106}$Ru, $^{144}$Pm, $^{170}$Tm, $^{137}$Cs, and $^{144}$Ce. The emitted charged particles 128 are moving at a high velocity and under the influence of a magnetic field 126 induced by a pair of permanent magnets 124A, 124B disposed on opposite sides of the chamber. The permanent magnets 124A, 124B may be coupled by a steel yoke (not shown) as is known in the art to improve the magnetic field 126 strength. The high velocity charged particles 128 under the influence of the magnetic field 126 are directed into a circular path 130. It should be noted that although statistically, there may be some overlap in the circular path of ejected particles and the opposite side of the radioactive isotope source, because the particles have the same electric charge as the radioactive isotope source, they will repel each other, resulting in the circulating electron beam. This is a consequence of the space charge effect. Thus, it is demonstrated above that achieving a sufficient magnetic field strength from commercially available permanent magnet materials to confine the relativistic electron is feasible with reasonable dimensions for a portable power source application as described hereafter.

It should also be noted that other radioactive isotopes emitting other charged particles may also be developed into functioning devices according to the principle of the disclosure described herein. For example, a radioactive isotope selected from the group consisting of $^{238}$Pu, $^{210}$Po, $^{242}$Cm, and $^{244}$Cm emits alpha particles which can also be harnessed in a device, such as those described above. However, it is important to note that characteristics of different charged particles, e.g. energy, charge, etc., will require adjustments in the design parameters. For example, because alpha particles usually possess more kinetic energy (5 MeV or more) than beta particles, stronger magnetic fields will be required to yield the circulating charged particle beam. In addition, the positive charge of the alpha particles will require an inversed magnetic field to induce circulation in the same direction as the beta particles. Such adjustments to accommodate different charged particles from different radioactive isotopes shall be apparent to those skilled in the art. However, it should be noted that an embodiment employing an alpha particle source will be significantly more difficult to implement and may be impractical in many cases. For example, it is much more difficult to confine alpha particles due to their mass, which is much greater than alpha particles (i.e., electrons). This is evident from Equation (10) as will be understood by those skilled in the art.

The cyclotron radiation frequency due to electron circulating inside a chamber due to the magnetic field B is given by the plasma frequency per the following equation. Cyclotron radiation is yielded as a narrow line of emission at the frequency of the cyclotron orbit per Equation (11) below. In addition, the cyclotron radiation comprises smaller spikes at 2ω and 3ω. Cyclotron radiation is described in section 5.1 of http://casa.colorado.edu/~wcash/APS3730/textbook.htm, which is incorporated by reference herein.

$$\omega = \frac{eB}{2\pi m_e c} = \frac{4.8\times10^{-10}B}{2\pi\times0.91\times10^{-27}\times3\times10^{10}} = 2.8\times10^6\ \text{B(Hz)} \tag{11}$$

Applying the estimated magnetic field of 2.4 K Gauss calculated from the example magnet above, the frequency of the radiation is given as follows. Cyclotron radiation decays exponentially. For example, it takes about a minute to lose approximately 63%, i.e., (1-1/e), of energy of cyclotron radiation where B=2.4 KGauss. Cyclotron losses are described Ibid., section 5.2, which is incorporated by reference herein.

$$\omega=2.8\times10^6\times2.4\times10^3\ \text{(Hz)}=6.7\ \text{GHz} \tag{12}$$

As previously mentioned, embodiments of the disclosure convert the cyclotron radiation to a voltage using one or more rectennas. Some example rectenna structures are described in the next section.

2. Rectenna Electromagnetic Energy Conversion

Embodiments of the disclosure operate using one or more rectennas to receive and convert electromagnetic radiation to a voltage. Such devices can yield efficiencies typically above fifty percent. A rectenna combines a receiving antenna (e.g., a patch antenna) for electromagnetic radiation at a frequency and a rectifying circuit for converting the frequency of the received electromagnetic radiation signal to a direct current voltage as is known in the art. Embodiments of the disclosure may be implemented with any suitable known rectenna structure designed to operate in the applicable frequency range of the cyclonic radiation from the circulating charged particle beam, e.g., approximately 6.7 GHz.

Figure 2A:
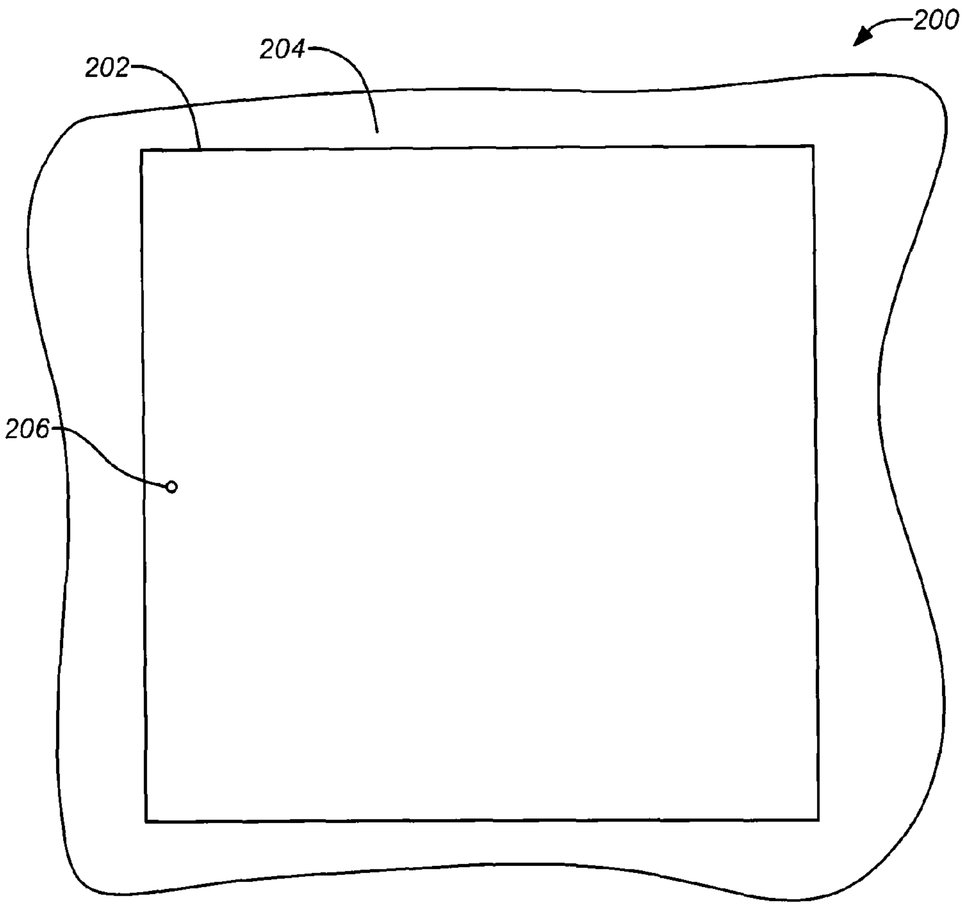
FIG. 2A illustrates a top view of an example rectenna that may be used in an embodiment of the disclosure.

FIG. 2A illustrates a top view of an example rectenna 200 that may be used in an embodiment of the disclosure. The rectenna 200 may be constructed as planar microstrip patch antenna comprising a front conductive patch 202 for receiving incident radiation disposed on a substrate material 204. The substrate material 204 may be a dielectric material such as many circuit board materials, e.g., Flame Resistant (FR4), RT 6010 and RT 5870 and other duroids or polyimides. The patch is coupled to a probe 206 from the backside of the substrate 204 (although other probe configurations are possible as well).

Figure 2B:
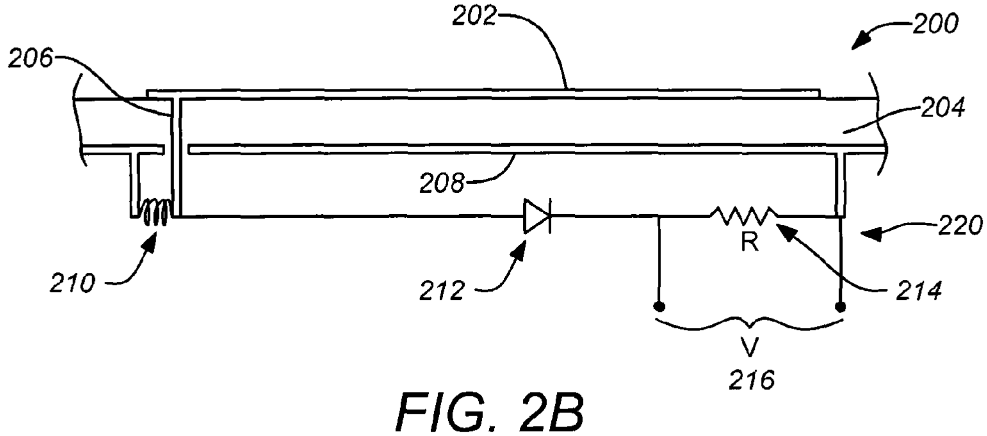
FIG. 2B illustrates a side view of the example rectenna including a basic circuit that may be used in an embodiment of the disclosure.

FIG. 2B illustrates a side view of the example rectenna 200 including a basic rectifying circuit 220 that may be used in an embodiment of the disclosure. A ground plane 208 of conductive material is disposed on the backside of the substrate material 204. Both the ground plane 208 and the conductive patch 202 may be formed from conductive metals as employed in printed circuit board construction. The ground plane 208 is coupled to the patch 202 through a coil 210 to the probe 206. The patch 202 is also coupled to the Schottky diode 212 through the probe 206 to allow a current flow from the patch 202. The opposite side of the diode 212 is coupled to the ground plane 208 through an RF load 214. The output DC voltage 216 is delivered across the RF load 214. As used in the beta energy extraction device, the output voltage 216 may be applied to power electronics directly (after power conditioning) or to store electrical energy in a battery power storage system to be used later.

Figure 2C:
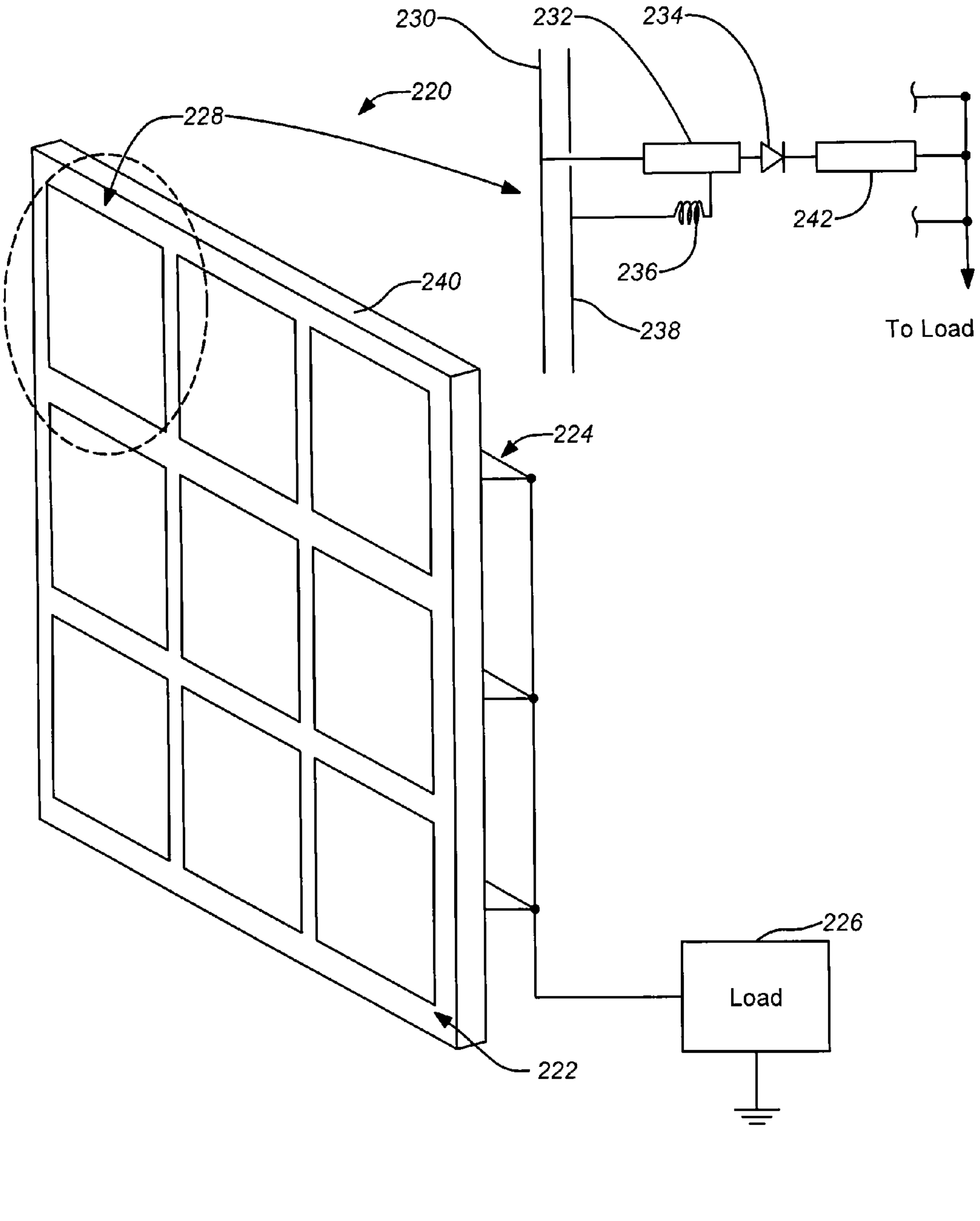
FIG. 2C illustrates a plurality of rectennas in an array coupled together that may be employed in an example embodiment.

FIG. 2C illustrates a plurality of rectennas in an array 220 coupled together that may be employed in an example embodiment. The array 220 comprises a plurality of individual rectennas 222 (nine in the example) that are electrically coupled (ganged) at their DC voltage outputs 224 and applied to a load 226. The electrical configuration of one example rectenna 228 of the array 220 is shown. The rectenna 228 comprises a front conductive patch 230 that is coupled to a waveguide 232. The waveguide 232 leads RF output from the conductive patch 230 a diode 234 (e.g., a Schottky diode). A coil 236 is coupled to a ground plane 238, separated a distance from the conductive patch 230 by the substrate 240 of the array 220, and provides a DC short circuit (ground) based on a typical LRC (inductor, capacitor & resister) circuit. A radial stub 242 may coupled to the diode 234 to filter out any unwanted harmonics generated by antenna element, i.e. as a bandstop filter. It should be noted that although the rectenna array is shown in FIG. 2C as a planar array, the rectenna array may also be formed onto a curved surface into a cylindrical chamber wall as illustrated in the examples of the next section. Some loss of efficiency may result. Alternately, a rectenna array around a cylindrical wall may be formed from multiple flat individual rectannas that is actually a polygon (viewed from above).

As described, embodiments of the disclosure employ one or more rectennas designed to convert the selected cyclotron radiation frequency, e.g., 6.7 GHz. Any properly sized suitable known rectenna design may be used as will be understood by those skilled in the art. For example, e.g., Heikkenen et al., "Planar Rectennas for 2.45 GHz Wireless Power Transfer", IEEE 0-7803-6267-5, 2000 and Akkermans et al., "Analytical Models for Low-Power Rectenna Design, IEEE 1536-1225, 2005, which are both incorporated by reference herein. The rectenna in a frequency range around the example frequency of approximately 6.7 GHz is well understood. The magnitude of power yielded is a function of the quantity of radioactive isotope. Those skilled in the art will appreciate that rectenna efficiency can be traded with the amount of isotope used depending upon the application, e.g. a battery application.

3. Energy Extraction Devices Using a Radioisotope Charged Particle Source

Figure 3A:
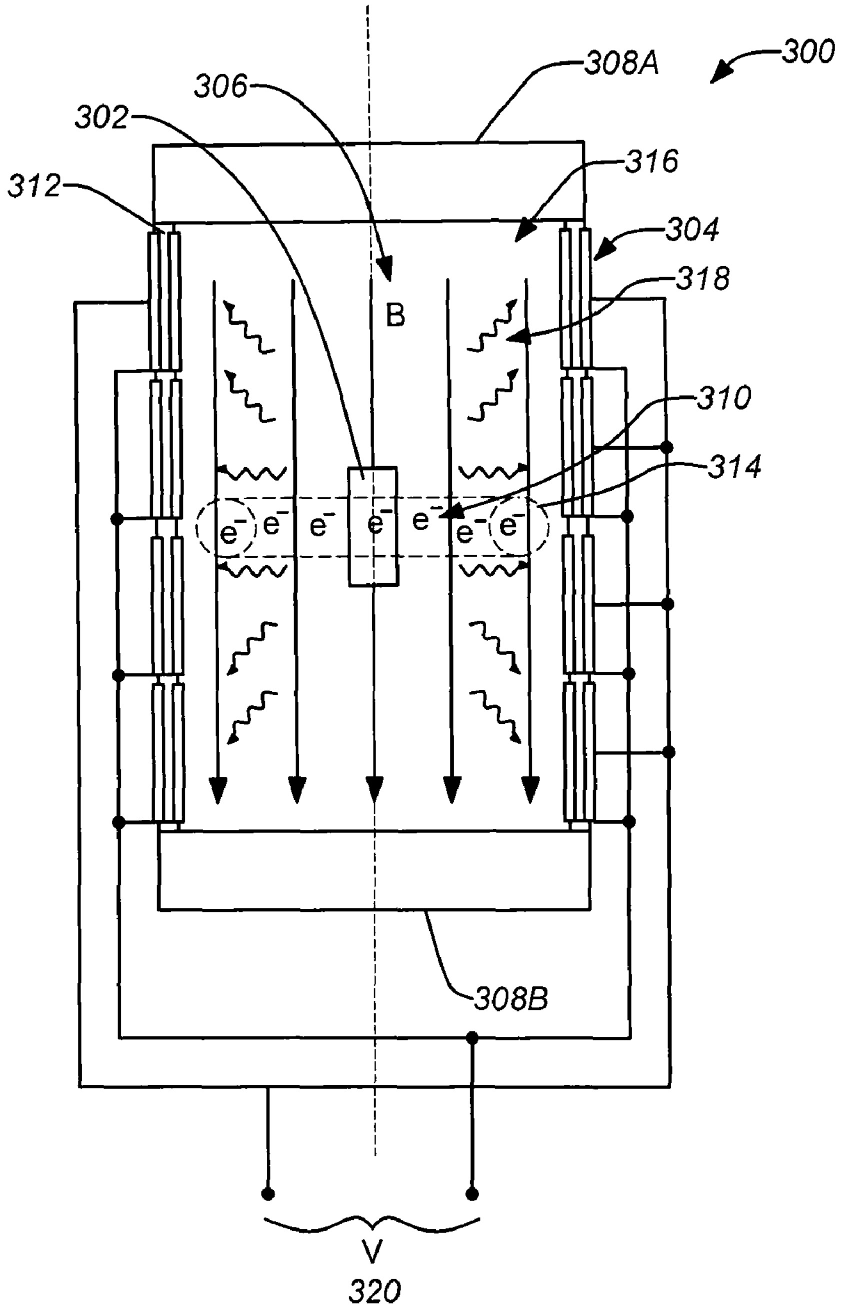
FIG. 3A is a schematic diagram of an energy extraction device that uses a radioactive isotope charged particle source and rectennas.

FIG. 3A is a schematic diagram side view of an energy extraction device 300 that uses a radioactive isotope 302 charged particle source and one or more rectennas 304. The radioactive isotope 302 is disposed centrally within the cylindrical chamber 316. A support for radioactive isotope 302 may be constructed by any configuration and materials known in the art. For example, a platform can be wrapped around metallic rod (comprising the radioactive isotope 302) in the center of the cylindrical chamber 316 and supported by two end caps dipole magnets of the end caps, e.g., magnets 308A, 308B. A magnetic field 306 is applied axially across the cylindrical chamber 316 by permanent magnets 308A, 308B disposed at opposing ends. The magnetic field 306 causes the emitted and energized charged particles 310 to spiral outward in circular paths rather than moving directly to the wall 312 of the cylindrical chamber 316. The charged particles 310 form a circulating electron beam 314 within the cylindrical chamber 316 as previously described.

The circulating electron beam 314 generates cyclotron electromagnetic radiation 318 of a particular frequency according to the analysis in the prior section. The electromagnetic radiation 318 is then received by the rectennas 304 disposed on the wall 312 of the cylindrical chamber 316. The rectennas 304 convert the received electromagnetic radiation 318 to a voltage as previously described and detailed in FIGS. 2A & 2B. The individual output voltages of the rectennas 304 may be combined in series or parallel to yield an output voltage 320 of the device 300. They output voltage 320 may be applied to battery storage or directly to power electrical systems or both. For example, a particular energy extractor may yield enough DC energy such that a portion of the energy is used to power the various systems (e.g. transponders, control systems on a spacecraft) while the remaining energy is used to charge a battery for later use.

Because the magnetic field 306 provides the only influence on the charged particles 310 emitted by the radioactive isotope 302, proper tuning of the device 300 may be accomplished by varying the magnetic field 306 in operation. Accordingly, permanent magnets 308A, 308B may comprise an electromagnet which can be used to tune the magnetic field 306. The electromagnet may replace or combine with the permanent magnets 308A, 308B to operate the device 300.

Figure 3B:
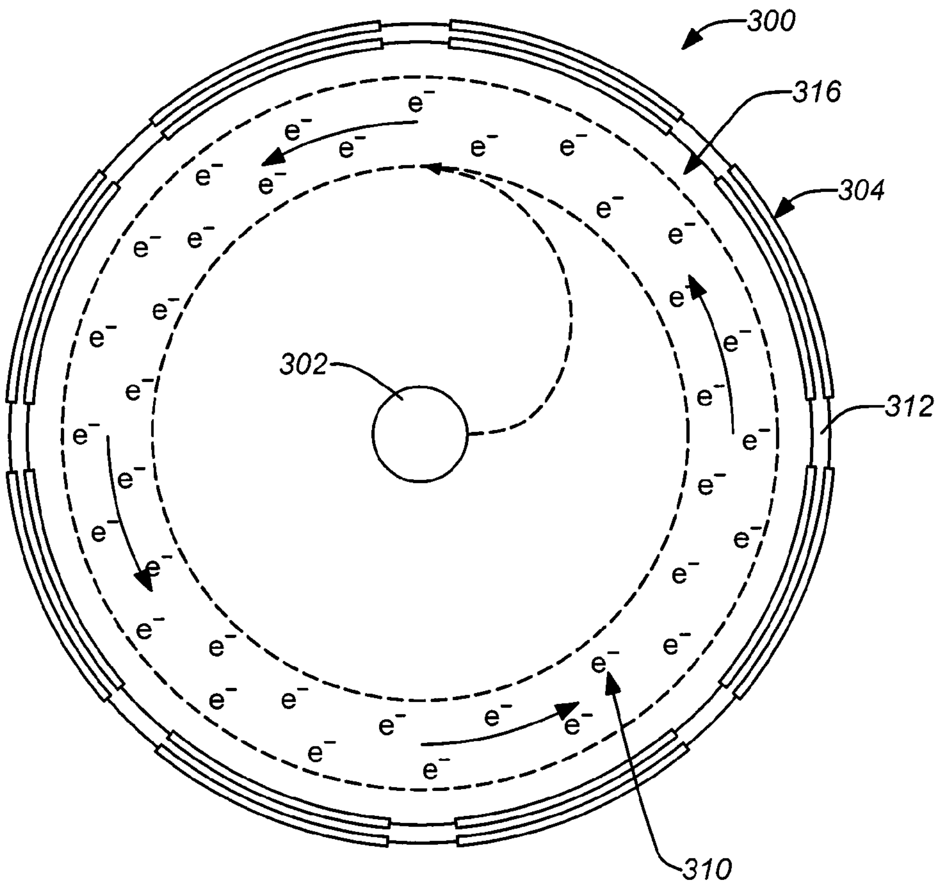
FIG. 3B illustrates a top view of an energy extraction device that uses a radioactive isotope charged particle source and rectennas.

FIG. 3B illustrates a top view of an energy extraction device 300 shown in FIG. 3A that uses a radioactive isotope 302 charged particle 310 source and rectennas 304. The one or more rectennas 304 may be disposed around the wall 312 of the cylindrical chamber 316. Thus, most of the interior surface of the wall 312 of the cylindrical chamber 316 may be used for rectennas 304.

A force will be exerted on an each charged particle 310 emitted by the radioactive isotope 302 and moving through a magnetic field 306 that is normal to both the magnetic field 306 (refer to FIG. 3A) and to the path of the charged particle 310. The direction of the force causes the charged particle 310 to follow a curved path rather than a straight line. (Refer to FIGS. 1A & 1B.) This may be applied to the device 300 of FIGS. 3A & 3B. The upper magnet 308A is a south pole and the lower magnet 308B is a north pole. The magnetic field 306 causes their paths to bend resulting in circular trajectories within the chamber 316. The charged particles 310 are emitted from the radioactive isotope 302 already with relatively high energy. For example, $^{90}$Sr emits beta particles having a kinetic energy of approximately 2-3 MeV. As long as the charge particles are circling inside the chamber (e.g. a vacuum cylinder), they will lose their kinetic energy completely through the cyclotron radiation. The amount of energy converted depends on the efficiency of the particular rectenna. However, a typical rectenna efficiency should yield approximately 60% to 70% of the isotope energy converted to DC power. Once the charged particles lose all their kinetic energy, they will be absorbed to nearby material, e.g., the chamber wall or magnet, which will accumulate negative charges. These accumulated charges can be discharged.

It should also be noted that the overall device 300 structure including the chamber 316 may further include additional shielding and other suitable structural elements that are typically employed in devices that utilize radioactive isotopes as known in the art.

To implement embodiments of the disclosure using beta particles (having a charge substantially identical to an electron) various radioactive isotopes are possible. For example, the radioactive isotope emitting beta particles may be selected from the group consisting of $^{90}$Sr, $^{106}$Ru, $^{144}$Pm, $^{170}$Tm, $^{137}Cs$, and $^{144}Ce$. It should also be noted that other radioactive isotopes emitting other charged particles may also be developed into functioning devices according to the principle of the disclosure. For example, a radioactive isotope selected from the group consisting of $^{238}Pu$, $^{210}Po$, $^{242}Cm$, and $^{244}Cm$ emits alpha particles which can be harnessed in a crossed magnetic field device, such as those described above. However, it is important to note that characteristics of different charged particles, e.g. energy, charge, etc., will require adjustments in the design parameters. For example, because alpha particles usually possess more kinetic energy (5 MeV or more) than beta particles, stronger magnetic fields will be required.

Figure 4:
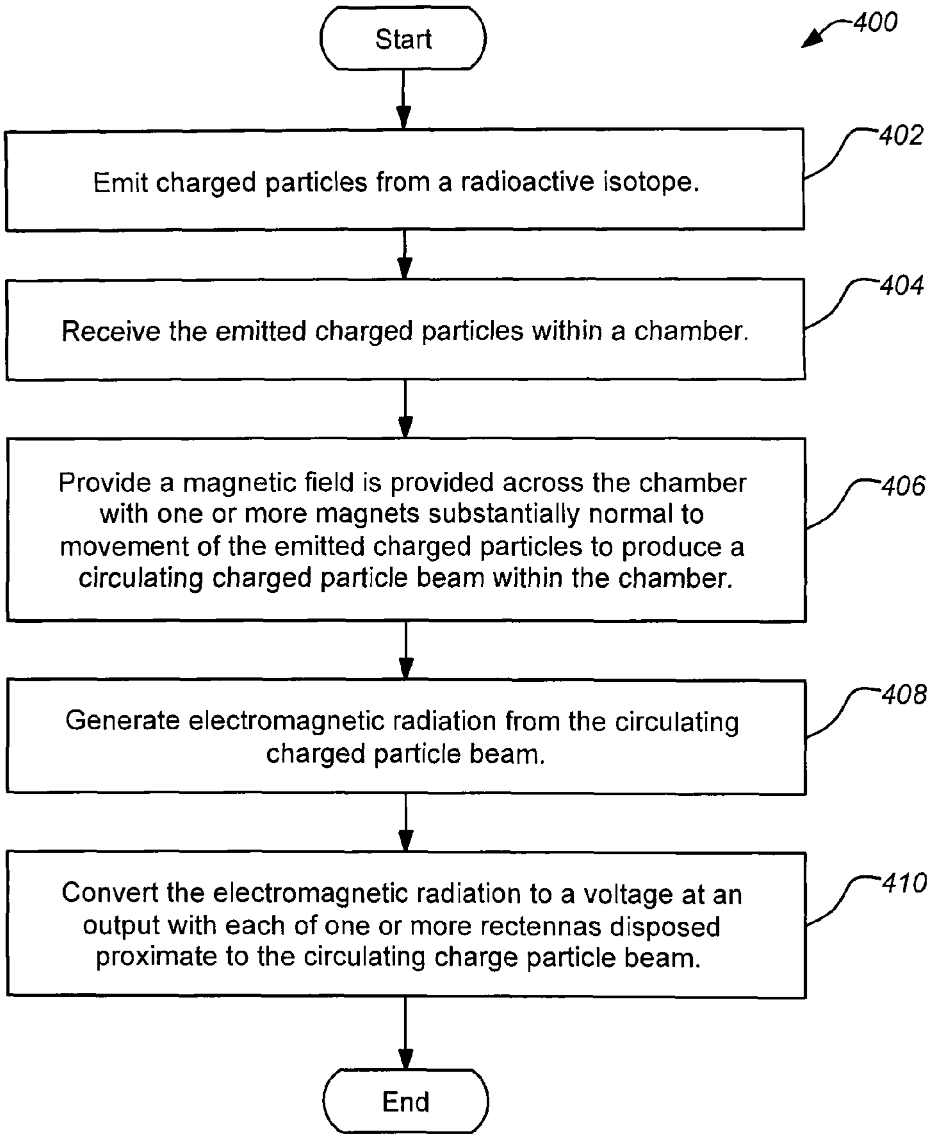
FIG. 4 is a flowchart of an exemplary method of operating an energy extraction device employing a radioactive isotope charged particle source and rectennas.

FIG. 4 is a flowchart of an exemplary method 400 of extracting energy from a radioactive isotope charged particle source. The method 400 begins with a step 402 of emitting charged particles from a radioactive isotope. Next, the emitted charged particles are received within a chamber in step 404. Following this, a magnetic field is provided across the chamber with one or more magnets substantially normal to movement of the emitted charged particles to produce a circulating charged particle beam within the chamber in step 406. Next in step 408 electromagnetic radiation is generated from the circulating charged particle beam. Finally in step 410, the electromagnetic radiation is converted to a voltage at an output with each of one or more rectennas disposed proximate to the circulating charge particle beam. The method 400 may be further modified consistent with the exemplary devices described above.

This concludes the description including the preferred embodiments of the present disclosure. The foregoing description including the preferred embodiment of the disclosure has been presented for the purposes of illustration and description. It is not intended to be exhaustive or to limit the disclosure to the precise forms disclosed. Many modifications and variations are possible within the scope of the foregoing teachings. Additional variations of the present disclosure may be devised without departing from the inventive concept as set forth in the following claims.

What is claimed is:

1. An apparatus, comprising:
a radioactive isotope emitting charged particles;
a chamber receiving the emitted charged particles;
one or more magnets disposed to provide a magnetic field across the chamber and substantially normal to movement of the emitted charged particles to produce a circulating charged particle beam within the chamber, the circulating charged particle beam yielding electromagnetic radiation; and
one or more rectennas disposed proximate to the circulating charge particle beam, each converting the electromagnetic radiation to a voltage at an output.

2. The apparatus of claim 1, wherein the one or more magnets comprises a plurality of permanent magnets disposed at opposing sides of the chamber.

3. The apparatus of claim 1, wherein the radioactive isotope is disposed centrally within the chamber.

4. The apparatus of claim 1, wherein the chamber is cylindrical and the magnetic field is provided along a length of the cylindrical chamber.

5. The apparatus of claim 4, wherein the one or more magnets comprises a plurality of permanent magnets disposed at opposing ends of the cylindrical chamber.

6. The apparatus of claim 4, wherein the one or more rectennas comprise a plurality of rectennas disposed around an interior wall of the cylindrical chamber.

7. The apparatus of claim 6, wherein the one or more magnets comprises a plurality of permanent magnets disposed at opposing ends of the cylindrical chamber and the radioactive isotope is disposed centrally within the chamber.

8. The apparatus of claim 1, wherein the charged particles comprise beta particles and the radioactive isotope is selected from the group consisting of $^{90}Sr$, $^{106}Ru$, $^{144}Pm$, $^{170}Tm$, $^{137}Cs$, and $^{144}Ce$.

9. The apparatus of claim 1, wherein the charged particles comprise alpha particles and the radioactive isotope is selected from the group consisting of $^{238}Pu$, $^{210}Po$, $^{242}Cm$, and $^{244}Cm$.

10. A method, comprising the steps of:
emitting charged particles from a radioactive isotope;
receiving the emitted charged particles within a chamber;
providing a magnetic field across the chamber and substantially normal to movement of the emitted charged particles with one or more magnets to produce a circulating charged particle beam within the chamber;
generating electromagnetic radiation from the circulating charged particle beam; and
converting the electromagnetic radiation to a voltage at an output with each of one or more rectennas disposed proximate to the circulating charge particle beam.

11. The method of claim 10, wherein the one or more magnets comprises a plurality of permanent magnets disposed at opposing sides of the chamber.

12. The method of claim 10, wherein the radioactive isotope is disposed centrally within the chamber.

13. The method of claim 10, wherein the chamber is cylindrical and the magnetic field is provided along a length of the cylindrical chamber.

14. The method of claim 13, wherein the one or more magnets comprises a plurality of permanent magnets disposed at opposing ends of the cylindrical chamber.

15. The method of claim 13, wherein the one or more rectennas comprise a plurality of rectennas disposed around an interior wall of the cylindrical chamber.

16. The method of claim 15, wherein the one or more magnets comprises a plurality of permanent magnets disposed at opposing ends of the cylindrical chamber and the radioactive isotope is disposed centrally within the chamber.

17. The method of claim 10, wherein the charged particles comprise beta particles and the radioactive isotope is selected from the group consisting of $^{90}Sr$, $^{106}Ru$, $^{144}Pm$, $^{170}Tm$, $^{137}CS$, and $^{144}Ce$.

18. The method of claim 10, wherein the charged particles comprise alpha particles and the radioactive isotope is selected from the group consisting of $^{238}Pu$, $^{210}Po$, $^{242}Cm$, and $^{244}CM$.

19. An apparatus, comprising:
a radioactive means for emitting charged particles;
means for receiving the circulating charged particle beam;
means for inducing a magnetic field substantially normal to movement of the emitted charged particles and producing a circulating charged particle beam yielding electromagnetic radiation; and
rectenna means for converting the electromagnetic radiation to a voltage.

20. The apparatus of claim 19, wherein the charged particles comprise beta particles.

* * * * *